Patented May 29, 1945

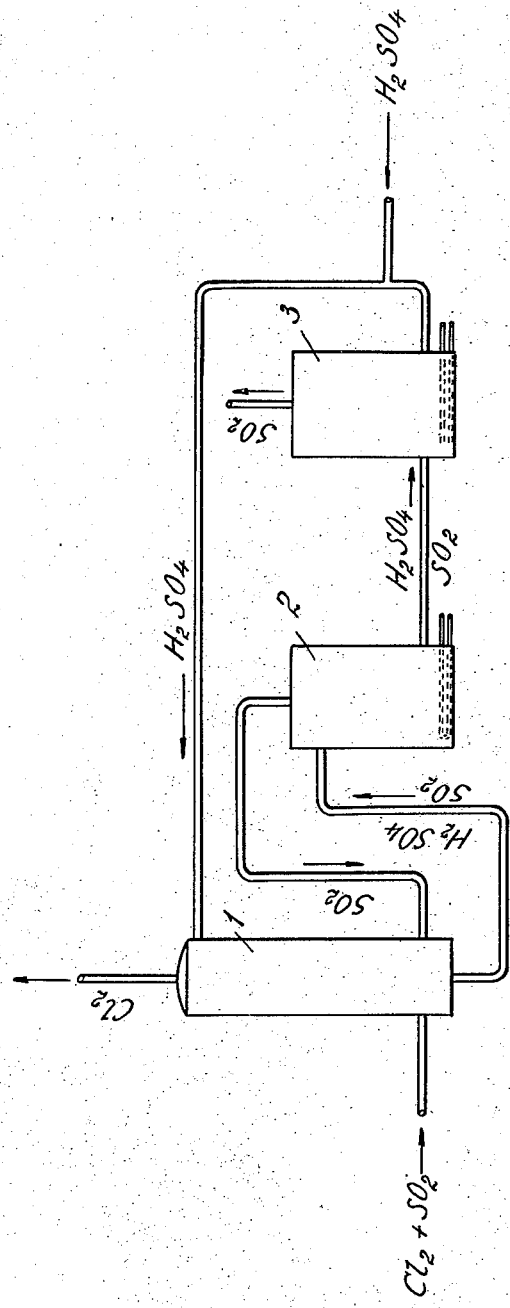

2,377,138

UNITED STATES PATENT OFFICE 2,377,138

SEPARATION OF CHLORINE AND SULPHUR DIOXIDE

James K. Farrell and William C. Eichelberger, Syracuse, N. Y., assignors to The Solvay Process Company, New York, N. Y., a corporation of New York Application September 18, 1942, Serial No. 458,774

3 Claims. (Cl. 23—178)

This invention relates to a method for the separation of chlorine from sulphur dioxide, more particularly to an improvement in the process for the preparation of chlorine by the reaction of sodium chloride and sulphur trioxide which permits the economical recovery of the chlorine product free of sulphur dioxide.

As is well known, the usual method for the preparation of chlorine involves the electrolysis of sodium chloride to form equivalent amounts of chlorine and sodium which is subsequently converted to sodium hydroxide. While this method has been practiced widely on a commercial scale with considerable success, it is sometimes desirable from an economic standpoint to produce chlorine without concurrently producing equivalent quantities of sodium hydroxide, since if market conditions are such that chlorine is in great demand but sodium hydroxide is not, the necessary concurrent production and subsequent disposal of the latter substance adversely affects the economy of the entire operation. However, in spite of this situation the electrolytic process is still used practically exclusively for the production of chlorine from sodium chloride.

It has been known for some time that sulphur trioxide and sodium chloride may be reacted to yield chlorine, sulphur dioxide and sodium sulphate; since the sodium sulphate is a valuable, easily disposable by-product, this method presents the possibility of economically producing chlorine from sodium chloride without concurrently producing sodium hydroxide. However, this method has not come into general commercial use because the chlorine produced by this reaction is always obtained in admixture with an equimolecular quantity of sulphur dioxide and no economical procedure for separating these gases from one another has been devised. Attempts have been made to accomplish this separation by liquefying the gases and fractionally distilling the chlorine from the sulphur dioxide; however, since a constant boiling mixture of sulphur dioxide and chlorine is formed, this procedure does not provide a suitable method for recovery of all the chlorine produced by the reaction. It has also been suggested that the chlorine-sulphur dioxide mixture produced be passed over a suitable catalyst to convert the sulphur dioxide to sulphur trioxide, and the sulphur trioxide reacted with additional quantities of sodium chloride, these steps being continued until substantially no sulphur dioxide remains in the gas; however, this method is unduly complicated, requiring several recirculations of the chlorine product over the sodium chloride reactant, and hence is not commercially feasible. Separation of the chlorine and sulphur dioxide by absorption of one or the other constituent in a solvent therefor has also been suggested, but so far as we are aware no economical method for carrying out such separation has as yet been achieved. Accordingly, since no satisfactory method for separating chlorine and sulphur dioxide has been developed, the reaction of sulphur trioxide and sodium chloride has not been utilized to any extent for the production of chlorine.

It is an object of this invention to provide a method for separating chlorine from sulphur dioxide.

It is a more specific object of this invention to provide an improvement in the process of producing chlorine by the reaction of sulphur trioxide with sodium chloride whereby the chlorine product may be economically separated from the sulphur dioxide produced therewith.

In accordance with this invention chlorine and sulphur dioxide are separated by contacting a gaseous mixture of these substances in which the volume ratio of chlorine to sulphur dioxide is at least about 1:10 with sulphuric acid liquor containing at least about 75% $H_2SO_4$, preferably at an elevated pressure in the neighborhood of about three atmospheres. The sulphuric acid liquor, we have found, absorbs the sulphur dioxide, the bulk of the chlorine remaining unabsorbed and passing from the vessel in which the absorption is carried out; the sulphur dioxide may be recovered from the acid liquor in any suitable manner, e. g. by heating the solution or by blowing a gas such as air therethrough, and the regenerated acid liquor re-used. A preferred embodiment of our invention involves introducing the chlorine-sulphur dioxide mixture into the mid-section of a tower through which sulphuric acid liquor containing at least 75% $H_2SO_4$ is descending, thereby dissolving the sulphur dioxide and an extremely small portion of chlorine in the acid liquor, withdrawing substantially pure chlorine from the top of the tower, passing sulphuric acid liquor containing the sulphur dioxide and a small amount of chlorine dissolved therein from the absorption zone to a partial stripping zone wherein a gas mixture rich in sulphur dioxide is evolved, returning the gas mixture thus evolved to the lower portion of the absorption zone, and removing the sulphuric acid liquor from the partial stripping zone for recovery of the sulphur dioxide remaining dissolved therein, since the recycling of a gas rich in sulphur dioxide to the lower part of the absorption zone in this manner reduces the amount of chlorine withdrawn therefrom in solution in the acid liquor and thereby enhances recovery of chlorine from the top of the tower.

The mixtures to be treated in accordance with this invention may contain chlorine and sulphur dioxide in the ratio of at least about 1:10 substantially undiluted with other gases, or may contain, in addition to these substances, substantial proportions, e. g. up to about 95% of the mixture, of inert diluents; the term "inert diluents" is intended to include gases such as air, oxygen, etc., inert with respect to chlorine, sulphur dioxide and the sulphuric acid liquor at the temperatures at which the separation is accomplished.

In carrying out the process of our invention the chlorine-sulphur dioxide mixture is preferably countercurrently contacted in a tower with a descending stream of sulphuric acid liquor containing at least 75% $H_2SO_4$. Commercial concentrated sulphuric acid containing between 95% and 99% $H_2SO_4$ is preferably utilized, but sulphuric acid containing as little as 75% $H_2SO_4$ or oleum containing, for example, 25% or more free $SO_3$ can be employed; the term "sulphuric acid liquor" is used throughout the specification and claims to include both sulphuric acid and oleum. Contact of the gas mixture and the acid liquor is preferably effected at superatmospheric pressures in the neighborhood of three atmospheres total pressure, since we have found separation of the chlorine and sulphur dioxide may thereby be more effectively accomplished; it will be understood, however, that the pressure employed may be atmospheric pressure or any pressure up to that at which liquefaction of one of the gaseous constituents at the temperature employed results. The temperature at which contact of the gaseous mixture with the sulphuric acid liquor is effected may suitably be between that at which the liquor solidifies and about 60° C., and preferably should not be above about 35° C.; cooling means to counteract the heat developed by solution of the sulphur dioxide in the acid liquor may be suitably disposed in the tower. The rates at which the gas mixture and sulphuric acid liquor are passed through the tower should be such as to absorb all the sulphur dioxide present in the gas but as little chlorine as possible, and thus may vary widely, depending chiefly upon the size and construction of the tower and the sulphur dioxide content of the gas; thus, for example, when treating a gas containing approximately equimolecular quantities of chlorine and sulphur dioxide undiluted with other gases in a packed tower having an inside diameter of about 4 ft., a gas flow of about 300 cu. ft./min. and an acid liquor flow of about 50 gal./min. are suitable. The undissolved chlorine is permitted to escape from the top of the tower to be recovered as desired; the sulphuric acid liquor containing the sulphur dioxide dissolved therein is withdrawn from the bottom of the tower and the sulphur dioxide may then be recovered therefrom as desired.

A preferred embodiment of our invention involves passing the sulphuric acid liquor containing sulphur dioxide dissolved therein withdrawn from the bottom of the absorber to a partial stripper wherein a gas mixture rich in sulphur dioxide is evolved either by heating the solution to about 10° to 25° C. above the absorption temperature, by reducing the pressure thereon, or by a combination of these means. The gas mixture rich in sulphur dioxide thus obtained is then returned to the base of the absorber; the partially stripped acid liquor is withdrawn and the sulphur dioxide remaining therein recovered as desired. By operating in this manner the amount of chlorine withdrawn from the absorber in solution in the acid liquor is reduced, thereby enhancing recovery of the chlorine at the top of the absorber. The partial stripping may also be effected by providing suitable heating means in the base of the absorber so that a gas mixture rich in sulphur dioxide is evolved in the lower portion of the absorber and rises into the absorption zone of the vessel, thus eliminating the necessity of operating a separate partial stripping unit.

The accompanying diagram illustrates the preferred embodiment of our invention. As shown in this diagram a mixture of chlorine and sulphur dioxide is introduced into the base of tower 1 and rises through the tower countercurrent to a stream of sulphuric acid, containing at least 75% $H_2SO_4$, introduced at the top of the tower. Substantially pure chlorine passes from the top of tower 1. The sulphuric acid containing sulphur dioxide dissolved therein is withdrawn from tower 1 to partial stripper 2, wherein it is heated to a temperature about 10° to 25° C. above the temperature of tower 1, thereby evolving a gas rich in sulphur dioxide; this gas is returned to the base of tower 1. The sulphuric acid, containing residual sulphur dioxide dissolved therein, passes from partial stripper 2 to stripper 3 wherein it is further heated to completely strip the acid of sulphur dioxide; the sulphur dioxide evolved is vented. The sulphuric acid from stripper 3 is mixed with make-up sulphuric acid and returned to tower 1.

Our invention is of particular utility in the process for the production of chlorine by the reaction of sulphur trioxide with sodium chloride, since in this process there is produced, as hereinabove pointed out, a mixture of substantially equimolecular amounts of chlorine and sulphur dioxide, which mixture may or may not be diluted with air or oxygen, depending upon whether undiluted sulphur trioxide or sulphur trioxide diluted with these ingredients was employed to react with the sodium chloride. By subjecting the mixture of chlorine and sulphur dioxide produced to treatment in accordance with our invention substantially complete separation of the chlorine from the sulphur dioxide may be cheaply and readily effected and the chlorine thus recovered in a form suitable for direct liquefaction; inert diluents, if any, present in the gas are recovered in admixture with the chlorine. The sulphur dioxide dissolved in the sulphuric acid liquor may be recovered and used to generate further quantities of sulphur trioxide for reaction with the sodium chloride and the stripped acid liquor may be re-used to separate additional quantities of chlorine and sulphur dioxide.

The process of our invention permits the employment of a cheap and readily available solvent for effecting the desired separation, and may be carried out at temperatures varying only slightly from room temperature, thus avoiding the expense and nuisance of refrigerating the mixture to accomplish its liquefaction as is necessary when it is attempted to separate these substances by fractionation; furthermore, the sulphuric acid liquor employed may be easily regenerated for re-use. Hence, it will be evident the process of our invention possesses many important advantages over prior methods heretofore proposed for accomplishing the desired separation and its use in the manufacture of chlorine from sulphur trioxide and sodium chloride will inevitably improve the efficiency and enhance the economy thereof.

Since certain changes may be made in carrying out the above process without departing from the scope of the invention, it is intended that all matter contained in the above description shall be interpreted as illustrative and not in a limiting sense.

We claim:

1. A process for the separation of chlorine from sulphur dioxide, which comprises contacting a gaseous mixture containing these substances in which the volume ratio of chlorine to sulphur dioxide is at least about 1:10 with sulphuric acid liquor containing at least about 75% $H_2SO_4$ at superatmospheric pressures in the neighborhood of about 3 atmospheres total and at a temperature above the freezing point of the acid liquor but below about 60° C., and separating a solution containing sulphur dioxide dissolved in the sulphuric acid liquor from undissolved chlorine.

2. A process for the separation of chlorine from sulphur dioxide which comprises introducing a gaseous mixture containing these substances in which the volume ratio of chlorine to sulphur dioxide is at least about 1:10 into a vessel through which is descending sulphuric acid liquor containing at least 75% $H_2SO_4$, the temperature of the acid liquor being maintained above its freezing point but below about 60° C. and the total pressure in the vessel being in the neighborhood of about 3 atmospheres, withdrawing chlorine substantially free of sulphur dioxide from the top of the vessel, withdrawing sulphuric acid liquor containing sulphur dioxide and a small amount of chlorine dissolved therein from the absorption zone to a partial stripping zone wherein a gas rich in sulphur dioxide is evolved, returning the gas thus evolved to the lower portion of the absorption zone, and recovering the sulphur dioxide remaining in the partially stripped sulphuric acid liquor.

3. A process for the separation of chlorine and sulphur dioxide, which comprises introducing a gaseous mixture containing substantially equimolecular quantities of these substances into a vessel through which is descending sulphuric acid liquor containing between about 95% and about 99% $H_2SO_4$, the temperature of the acid being maintained above its freezing point but below about 60° C. and the total pressure in the vessel being in the neighborhood of about 3 atmospheres, withdrawing chlorine substantially free of sulphur dioxide from the top of the vessel, withdrawing sulphuric acid containing sulphur dioxide and a small amount of chlorine dissolved therein from the absorption zone to a partial stripping zone, heating the solution in said partial stripping zone to evolve a gas rich in sulphur dioxide, returning the gas thus evolved to the lower portion of the absorption zone and recovering the sulphur dioxide remaining in the partially stripped sulphuric acid liquor.

JAMES K. FARRELL.
WILLIAM C. EICHELBERGER.